June 25, 1957  A. WEIGEL  2,797,082
BOX PULL SPRING HITCH
Filed March 9, 1954
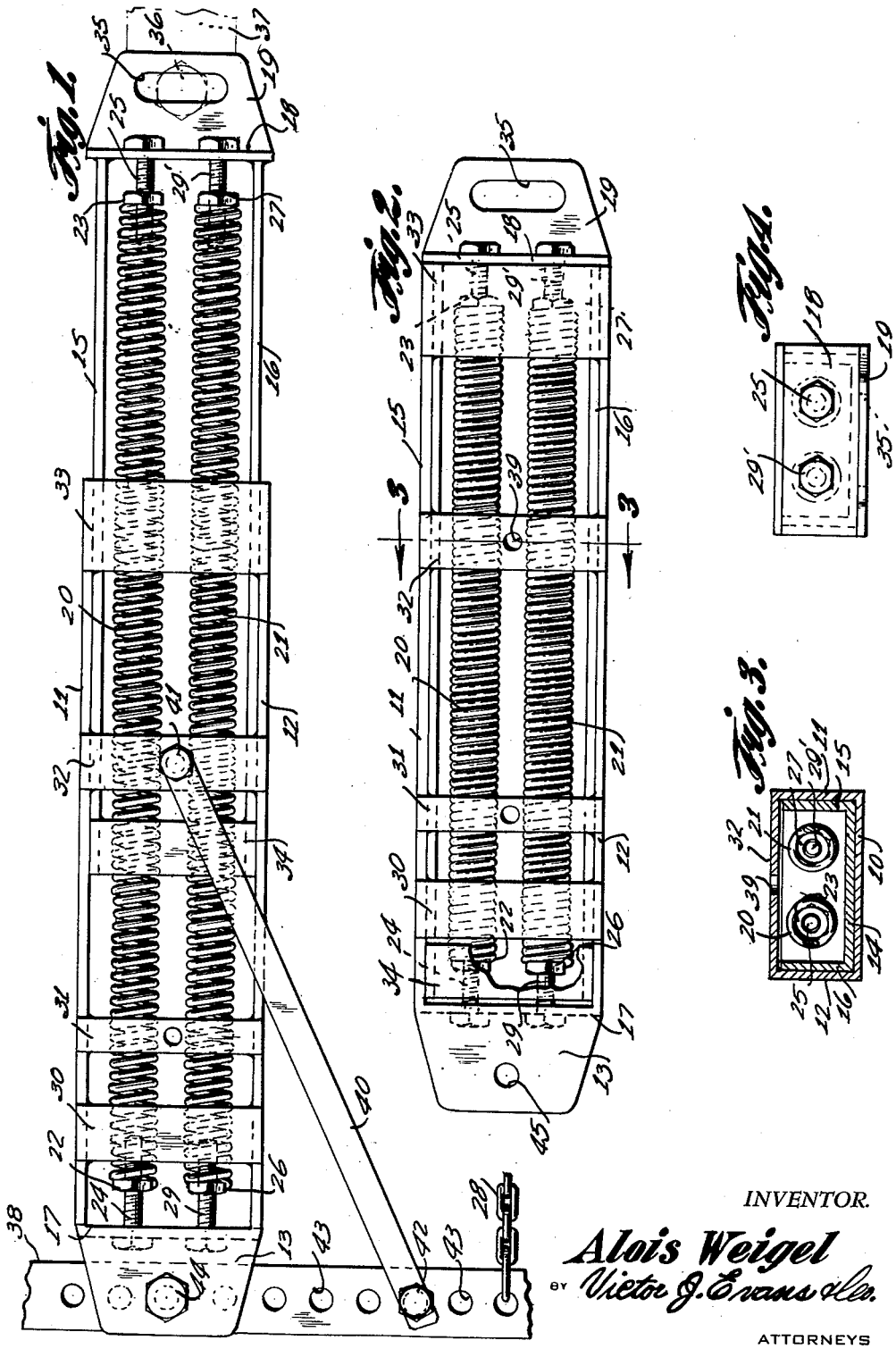
INVENTOR.
Alois Weigel
BY Victor J. Evans & Co.
ATTORNEYS

United States Patent Office 2,797,082
Patented June 25, 1957

2,797,082

BOX PULL SPRING HITCH

Alois Weigel, Burnstad, N. Dak.

Application March 9, 1954, Serial No. 415,075

5 Claims. (Cl. 267—73)

This invention relates to a hitch having resilient elements therein whereby the hitch is particularly adapted for connecting trailers and farm and other agricultural implements to tractors and the like, and in particular a hitch comprising telescoping casings, channel-shape in cross section having connecting flanges with openings therethrough extended at the ends and having a pair of tension springs positioned in the casings and adjustably connected to ends of the casings.

The object of the invention is to provide a box pull spring hitch one end of which is secured to a tractor draw bar and the other end of which is connected to the implement draw bar.

The purpose of this invention is to provide a comparatively solid hitch having resilient elements therein whereby the hitch is adapted to be extended longitudinally and in which the resilient elements retract the parts of the hitch when the parts are released.

Various attempts have been made to provide resiliency in hitches used for connecting trailers, farm implements, and the like to tractors, trucks, and other power supplying devices, however, where an implement is directly connected to a tractor, such as in connecting a disc or other substantially rigid device to a tractor it is advisable to provide resiliency in the hitch or draw bar of the connection whereby in making a sudden stop or in receiving a shock load, such as a cultivator blade or other parts of an implement striking a fixed obstruction the connection would be broken unless resiliency is provided therein. Although it is desirable to provide resiliency in a draw bar or hitch, it is also necessary to prevent buckling or bending in hitch connections of this type and for this reason it is desirable to provide a relatively rigid housing in which springs of a draw bar or hitch may be positioned. With this thought in mind this invention contemplates a pair of slidably mounted casings, each being channel-shape in cross section and one being slidably mounted in the other providing a telescoping housing and a pair of spaced parallel tension springs extended longitudinally through the housing with the ends of the springs integrally connected to nuts threaded on bolts extended inwardly from the ends of the housing.

The object of this invention is, therefore, to provide a telescoping hitch or drawbar in which telescoping casings are retracted by springs with tension on the springs increasing as the casings are extended and in which ends of the springs are secured to nuts threaded on bolts extended inwardly from the ends of the casings whereby the springs are extended as the casings are extended and wherein the casings are retracted with the springs returning to free or substantially free positions.

Another object of the invention is to provide an extensible element in a hitch or draw bar in which the element is adapted to be connected to a tractor, at one end and to a farm implement, or the like at the opposite end.

A further object of the invention is to provide an extensible draw bar or hitch having a pair of elongated tension springs therein in which the device is of a simple and economical construction.

With these and other objects and advantages in view the invention embodies a pair of draw bar casings, each channel-shape in cross section, and one being slidably mounted in the other with flanges having connecting openings therethrough extended from the ends of the casings and with a pair of springs positioned in the casings and mounted with ends thereof connected to opposite ends of the casings whereby as the casings are actuated longitudinally to extend the length of the elements the springs are placed in tension whereby upon release of the elements the springs contract and retract the extended ends of the elements.

Other features and advantages of the invention will appear from the following description taken in connection with the drawing, wherein:

Figure 1 is a view looking upwardly toward the under side of the draw bar illustrating the positions of the parts with the hitch or draw bar extended.

Figure 2 is a similar view showing the draw bar with the parts retracted.

Figure 3 is a cross section through the draw bar being taken on line 3—3 of Fig. 2.

Figure 4 is an end elevational view showing one end of the draw bar.

Referring now to the drawing wherein like reference characters denote corresponding parts, the improved hitch of this invention includes a pair of casings, channel-shape in cross section and including an outer casing having a back 10 with flanges 11 and 12 at the sides and having a flange 13 on one end. An inner casing has a back 14 and sides 15 and 16, and a web 17 connects the ends of the side walls 11 and 12. A web 18 connects the ends of the side wall 15 and 16 and has a flange 19 extended therefrom. Tension springs 20 and 21 extend through the casing, and nuts 22 and 23 are secured preferably by welding to the ends of the springs, and the nuts are threaded on studs 24 and 25, respectively. Nuts 26 and 27 are secured also preferably by welding to ends of the spring 21 and are threaded on studs 29 and 29', respectively.

The side walls 11 and 12 are retained in spaced relation by means of bars 30, 31, 32 and 33. As illustrated in the drawing, the side walls 15 and 16 are positioned to travel against the inner surfaces of the side walls 11 and 12 and above the cross bars 30 thru 33. A crosspiece 34 extends between the side walls 15 and 16 and is secured thereto.

The flange 19 is provided with an elongated opening 35 by which the inner casing may be attached to a tractor 37 or the like through the medium of a bolt and nut assembly 36. The outer casing may be attached to a plow draw bar or other part of an implement as indicated by the numeral 38, by means of a pin or bolt and nut assembly 44 which extends through an opening 45 in the flange 13. The bolt 44 also extends through one of the plurality of openings 43 in the plow draw bar 38.

The bar 32 is provided with an opening 39, and a brace 40 has one end connected to the bar 32 by means of a pin or bolt and nut assembly 41, and the bolt and nut assembly 41 extends through the opening 39. The other end of the brace 40 is connected to the draw bar 38 by means of a pin or bolt 42 which extends through one of the openings 43 in the draw bar 38. A chain 28 is also adapted to be arranged in engagement with one of the openings 43 in the implement draw bar 38. The chain 28 serves the same purpose as the chain 28 shown and described in my co-pending application, Serial No. 414,282, now Patent No. 2,725,110, granted November 29, 1955, for an Over Center Clutch Lever.

Tension on the springs 20 and 21 may readily be adjusted by turning the studs on which the nuts are threaded and with the parts assembled in this manner, comparatively heavy loads may be absorbed by the hitch with the springs protecting the device against shock loads that are adapted to break parts of implements and the like. The oblong or elongated opening 35 is on the end of the hitch that is attached to the tractor 37, while the opening 45 is arranged contiguous to the plow or implement. Thus, the outside box of the hitch is fastened to the bar 38 of the implement, while the inside box is fastened to the bar 37 of the tractor. The brace 40 is attached to the implement draw bar 38 and also to the crosspiece 32 as previously described in order to hold the hitch in place. Thus, there has been provided a box pull spring hitch one end of which is attached to the tractor draw bar 37 while the other end is attached to the implement draw bar 38. The principal purpose of this hitch is that when the plow or implement 38 being drawn, hits a fixed object such as a rock for example, the springs 20 and 21 become extended and the chain 28 from the plow or other implement 38, which is fastened to the plow and also to the over center clutch lever shown and described in my co-pending application, disengages the clutch of the tractor to thus stop the tractor. Thus, no damage will be caused to the plow or implement. The tractor operator can then lift the plow or otherwise release it from the rock or other fixed object that has been hit and proceed without further delay in rehitching the plow by merely engaging the over center lever. Often in striking rocks while plowing, the plow will become loose from the rock from the pull of the springs, to thus make it possible to proceed immediately by engaging the clutch of the tractor with the over center lever.

Thus, the box spring hitch of the present invention, although it can be used independently, is really designed for use with the over center clutch lever of my co-pending application. The chain 28 from the over center clutch lever is fastened to the implement 38 being drawn and when the implement strikes a fixed object, the springs 20 and 21 extend and after extending a fixed distance, the chain 28 attached to the over center clutch lever on one end, and on the implement 38 on the other end, pulls on the over center clutch lever and disengages the clutch on the tractor and thus brings it to a stop. The operator of the tractor can then step down and remove the implement from the object struck and without having to rehitch the implement, it is only necessary to push the lever on the over center clutch ahead and again proceed and this eliminates rehitching. The springs 20 and 21 may have any desired size or construction.

It will be understood that modifications, within the scope of the appended claims, may be made in the design and arrangement of the parts without departing from the spirit of the invention.

What is claimed is:

1. A box pull spring hitch comprising a pair of telescoping casings, channel-shaped in cross section, longitudinally disposed tension springs positioned in the casings, and means connecting the ends of the springs to ends of the casings, said casings having connecting elements on opposite ends thereof for connecting said casings to draw-bars.

2. A box pull spring hitch comprising a pair of telescoping casings, channel-shaped in cross section, longitudinally disposed tension springs positioned in the casings and means adjustably connecting the ends of the springs to ends of the casings, said casings having connecting elements on opposite ends thereof for connecting said casings to draw-bars.

3. A box pull spring hitch comprising a pair of telescoping casings, channel-shaped in cross section, longitudinally disposed tension springs positioned in the casings, means connecting the ends of the springs to ends of the casings, said casings having connecting elements on opposite ends thereof for connecting said casings to draw-bars, and means for retaining the casings in assembled relation.

4. In a box pull spring hitch, the combination which comprises an outer casing, channel-shaped in cross section having a back with flanges at the sides and having a web connecting the flanges at one end of the casing, said casing also having an extension with an opening therein at one end of the back, an inner casing also channel-shaped in cross section nested in the outer casing and slidably mounted in said outer casing, said inner casing also having a back with flanges at the sides and having a web connecting the flanges at one end of the casing, said inner casing also having an extension with an opening therein on one end, a pair of spaced parallel longitudinally disposed tension springs positioned in said casings, and means connecting the ends of the springs to the webs in the ends of the casings.

5. In a box pull spring hitch, the combination which comprises an outer casing, channel-shaped in cross section having a back with flanges at the sides and having a web connecting the flanges at one end of the casing, said casing also having an extension with an opening therein at one end of the back, an inner casing also channel-shaped in cross section nested in the outer casing and slidably mounted in said outer casing, said inner casing also having a back with the flanges at the sides and having a web connecting the flanges at one end of the casing, said inner casing also having an extension with an opening therein on one end, a pair of spaced parallel longitudinally disposed tension springs positioned in said casings, and bolts having nuts thereon and being mounted in the webs at the ends of the flanges of the casings and aligned with said springs, said nuts being integrally connected to the ends of the springs.

References Cited in the file of this patent

UNITED STATES PATENTS

| 1,304,261 | Cadman | May 20, 1919 |
| 1,598,744 | Potter | Sept. 7, 1926 |
| 1,694,944 | Horix | Dec. 11, 1928 |
| 2,397,964 | Hiniker | Apr. 9, 1946 |
| 2,463,716 | Richey | Mar. 8, 1949 |
| 2,509,357 | Krause | May 30, 1950 |

FOREIGN PATENTS

| 477,037 | Canada | Sept. 18, 1951 |
| 564,759 | France | Jan. 10, 1924 |